(12) United States Patent
Udezue et al.

(10) Patent No.: US 8,037,046 B2
(45) Date of Patent: Oct. 11, 2011

(54) COLLECTING AND PRESENTING TEMPORAL-BASED ACTION INFORMATION

(75) Inventors: Ojiakonobi Udezue, Redmond, WA (US); Anthony G. Thane, Redmond, WA (US); Carmen Zlateff, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 11/772,095

(22) Filed: Jun. 29, 2007

(65) Prior Publication Data

US 2009/0006475 A1 Jan. 1, 2009

(51) Int. Cl.
*G06F 17/30* (2006.01)
*G06F 7/00* (2006.01)

(52) U.S. Cl. ......... 707/706; 707/722; 707/736; 707/751

(58) Field of Classification Search .................. 707/706, 707/751
See application file for complete search history.

(56) References Cited

U.S. PATENT DOCUMENTS

| | | | |
|---|---|---|---|
| 5,173,854 A * | 12/1992 | Kaufman et al. ............. 715/222 |
| 5,613,108 A | 3/1997 | Morikawa | |
| 5,649,182 A | 7/1997 | Reitz | |
| 5,848,396 A | 12/1998 | Gerace | |
| 5,948,058 A | 9/1999 | Kudoh et al. | |
| 6,073,142 A | 6/2000 | Geiger et al. | |
| 6,092,067 A | 7/2000 | Girling et al. | |
| 6,370,554 B1 | 4/2002 | Sun-Woo | |
| 6,463,462 B1 | 10/2002 | Smith et al. | |
| 6,968,509 B1 | 11/2005 | Chang et al. | |
| 7,146,574 B2 | 12/2006 | Goldthwaite et al. | |
| 7,181,447 B2 | 2/2007 | Curtis et al. | |
| 7,353,246 B1 * | 4/2008 | Rosen et al. ................... 709/202 |
| 7,831,601 B2 * | 11/2010 | Oral et al. ..................... 707/741 |
| 2001/0042087 A1 | 11/2001 | Kephart et al. | |
| 2002/0069212 A1 | 6/2002 | Leonardos | |
| 2002/0080170 A1 | 6/2002 | Goldberg et al. | |
| 2002/0116399 A1 * | 8/2002 | Camps et al. ................. 707/200 |
| 2003/0009497 A1 | 1/2003 | Yu | |
| 2003/0096621 A1 * | 5/2003 | Jana et al. ..................... 455/456 |
| 2004/0064443 A1 | 4/2004 | Taniguchi et al. | |
| 2004/0153456 A1 * | 8/2004 | Charnock et al. ............... 707/10 |
| 2004/0177123 A1 | 9/2004 | Meek | |

(Continued)

FOREIGN PATENT DOCUMENTS

JP 11039570 A 2/1999

(Continued)

OTHER PUBLICATIONS

Goecks, et al., "Learning Users' Interests by Unobtrusively Observing Their Normal Behavior", available at least as early as Mar. 29, 2007, at <<http://delivery.acm.org/10.1145/330000/325806/p129-goecks.pdf?key1=325806&key2=0703615711&coll=GUIDE&dl=GUIDE&CFID=14972436&CFTOKEN=74258644>>, ACM, 2000, pp. 1-4.

(Continued)

*Primary Examiner* — Tim T Vo
*Assistant Examiner* — Sangwoo Ahn
(74) *Attorney, Agent, or Firm* — Lee & Hayes, PLLC (57) ABSTRACT

Functionality is described for collecting and presenting action information. The action information describes actions that take place on items at specified times. Among other applications, the functionality assists a user in identifying and accessing relevant items. In one illustrative case, the functionality can display action information in a timeline presentation.

20 Claims, 9 Drawing Sheets

U.S. PATENT DOCUMENTS

| | | | |
|---|---|---|---|
| 2004/0181581 A1 | 9/2004 | Kosco | |
| 2004/0221309 A1 | 11/2004 | Zaner et al. | |
| 2004/0225695 A1 | 11/2004 | Womack | |
| 2004/0261026 A1* | 12/2004 | Corson | 715/704 |
| 2005/0108644 A1 | 5/2005 | Finke-Anlauff et al. | |
| 2006/0041521 A1* | 2/2006 | Oral et al. | 707/1 |
| 2006/0064411 A1* | 3/2006 | Gross et al. | 707/3 |
| 2006/0074902 A1* | 4/2006 | Anderson et al. | 707/5 |
| 2006/0161523 A1 | 7/2006 | Dettinger et al. | |
| 2006/0211404 A1* | 9/2006 | Cromp et al. | 455/405 |
| 2006/0212362 A1 | 9/2006 | Donsbach et al. | |
| 2007/0067292 A1* | 3/2007 | Trowbridge et al. | 707/7 |
| 2007/0299631 A1 | 12/2007 | Macbeth et al. | |
| 2008/0005103 A1* | 1/2008 | Ratcliffe et al. | 707/5 |
| 2008/0010266 A1* | 1/2008 | Brunn et al. | 707/5 |
| 2009/0006465 A1* | 1/2009 | Sue | 707/103 R |

FOREIGN PATENT DOCUMENTS

| | | |
|---|---|---|
| JP | 2000348090 A | 12/2002 |
| JP | 2005165446 A | 6/2005 |

OTHER PUBLICATIONS

Rohall, et al., "Email Visualizations to Aid Communications", available at least as early as Mar. 29, 2007, at <<http://domino.research.ibm.com/cambridge/research.nsf/0/62fd8b3a73c2cfff85256ad4004e07ac/$FILE/remail-steve%20rohall.pdf>>, pp. 1-4.

PCT Search Report for Application No. PCT/US2008/066255, mailed on Oct. 31, 2008, 12 pgs.

Johann Eder, et al., Self-maintained Folder Hierarchies as Document Repositories, University of Klagenfurt, 2000, 8 pages.

The Mexican Office Action mailed Nov. 24, 2010 for Mexican Patent Application No. MX/a/2009/013454, a counterpart foreign application of U.S. Appl. No. 11/772,095.

Richard B. Segal, et al., Incremental Learning in SwiftFile, Proceedings of the Seventeenth International Conference on Machine Learning, 2000.

* cited by examiner

COLLECTING AND PRESENTING TEMPORAL-BASED ACTION INFORMATION

BACKGROUND

File systems typically associate metadata with stored items (such as documents). The metadata may describe the salient characteristics of an item, such as its size, its name, its creation date, and so forth. A search module can later retrieve one or more items based on the stored metadata. For example, a user can retrieve all word processing documents that were stored within the last month by specifying appropriate time span information as a search parameter.

In a similar manner, a social network service may allow users to create profiles. A profile is like metadata in that it describes the characteristics of a person, such as the person's age, gender, occupation, and so forth. A search module can allow a user to retrieve a list of individuals who have certain characteristics by entering appropriate profile information as a search parameter.

While the above approach to storing and retrieving information is widely used, it is sometimes not fully effective. For example, consider the illustrative scenario in which a user is attempting to retrieve a document that was forwarded to her in an Email message. Assume that the user has a vague idea that the document was received in the last year and that it pertains to a vacation offer sent by a travel agency. The user may also have a vague idea that she clicked on a link in the document and stored the document on local drive of her computer. Using conventional techniques, the user may attempt to locate the desired document by identifying documents stored in the last year that have certain telltale keywords in their file names (or bodies). But the user may have a relatively faulty recollection of the content of the desired document itself; as such, using this search technique, it may take the user a significant amount of time to locate the desired item.

SUMMARY

Functionality is described for collecting and presenting action information. The action information describes actions that take place on items at specified times. Among other applications, the functionality assists a user in identifying and accessing relevant items.

In one illustrative case, the functionality can display action information in a timeline presentation. The timeline presentation identifies actions that occur on items by placing item identifiers at appropriate locations along the timeline. The functionality includes various controls that allow a user to control different aspects of the timeline presentation.

Additional exemplary implementations features are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for collecting and presenting action information. The functionality can be manifested in various systems, apparatuses, modules, procedures, storage mediums, data structures, and other forms.

As used herein, an "item" corresponds to any object that is the target of some action. An item may correspond to a file, a unit of information, a tangible article, a person, a group of people, an abstract concept, and so on. An "item type" corresponds to a general category of items. To cite merely one introductory example, an item type may correspond to the general category of image files. An individual image file corresponds to an item within this category. The ensuing discussion sets forth several examples of item types and associated items.

An "action" corresponds to an operation that is performed on an item or which is otherwise associated with the item. For example, assume that the user removes a red-eye effect from a digital photograph and then compresses this image. The red-eye removal operation corresponds to a first action. The compression of the image file corresponds to a second action. The ensuing discussion sets forth several examples of different types of actions. The term "action information" corresponds to any information which describes an action.

This disclosure includes the following sections. Section A describes an illustrative system for collecting and acting on action information. Section B describes illustrative procedures that explain the operation of the system of Section A.

A. Illustrative System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain features are described in flow chart form. In this mode explanation, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

A.1. Overview of System

Figure 1:
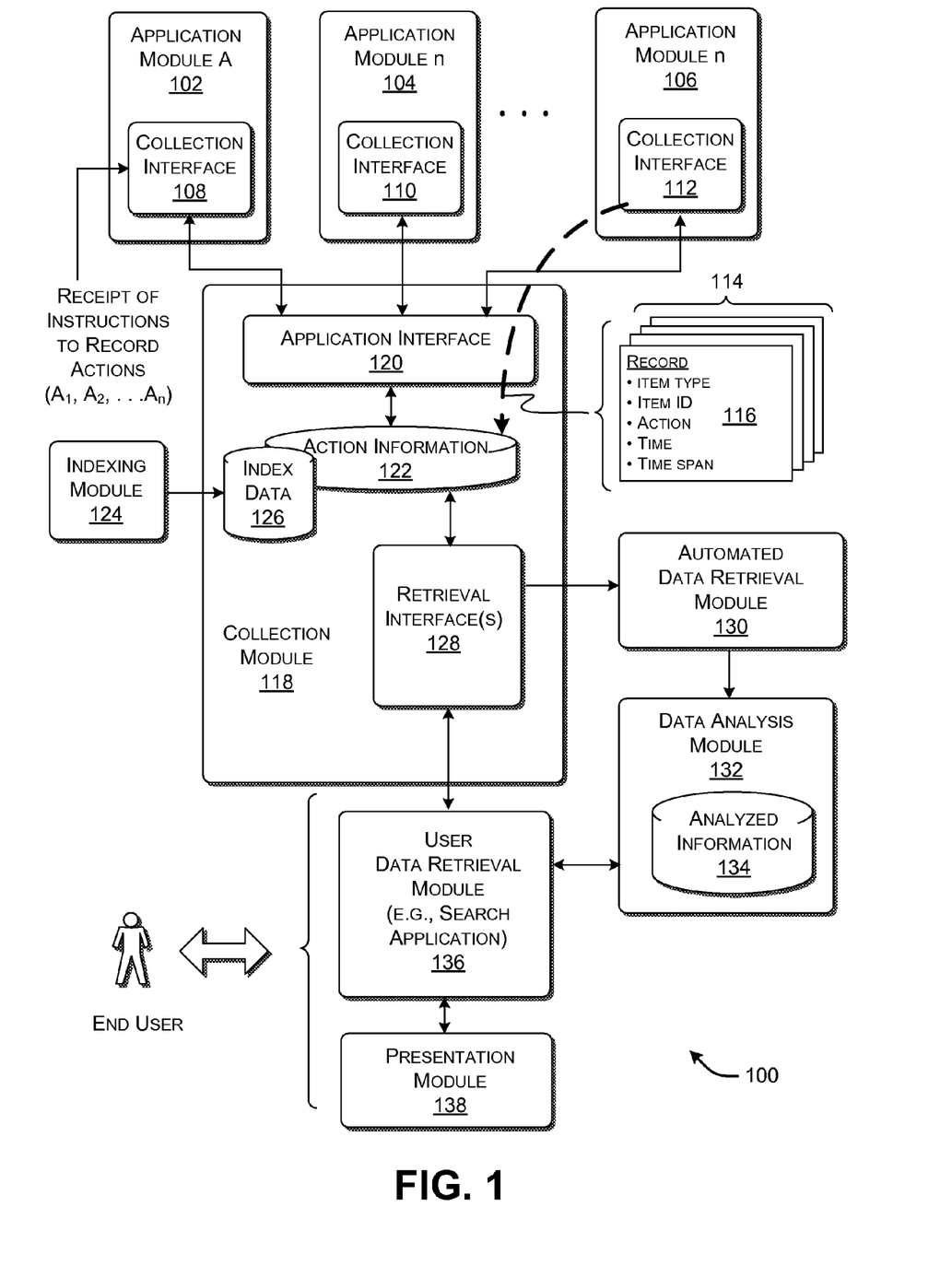
FIG. 1 shows a system for storing and processing action information.
Figure 2:
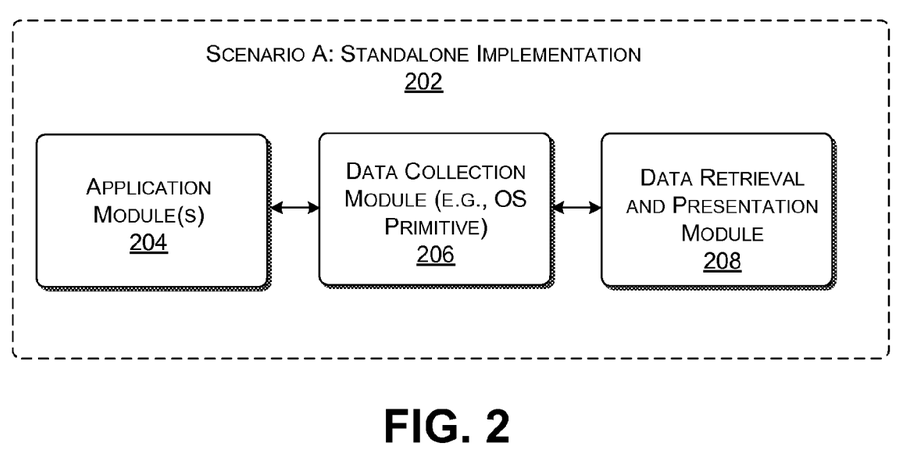
FIG. 2 shows a first standalone implementation of the system of FIG. 1.
Figure 3:
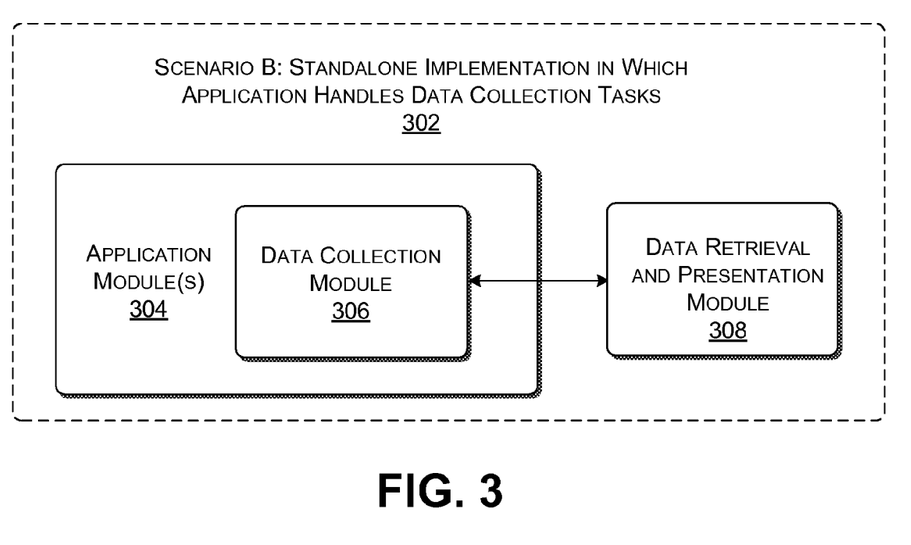
FIG. 3 shows a second standalone implementation of the system of FIG. 1.
Figure 4:
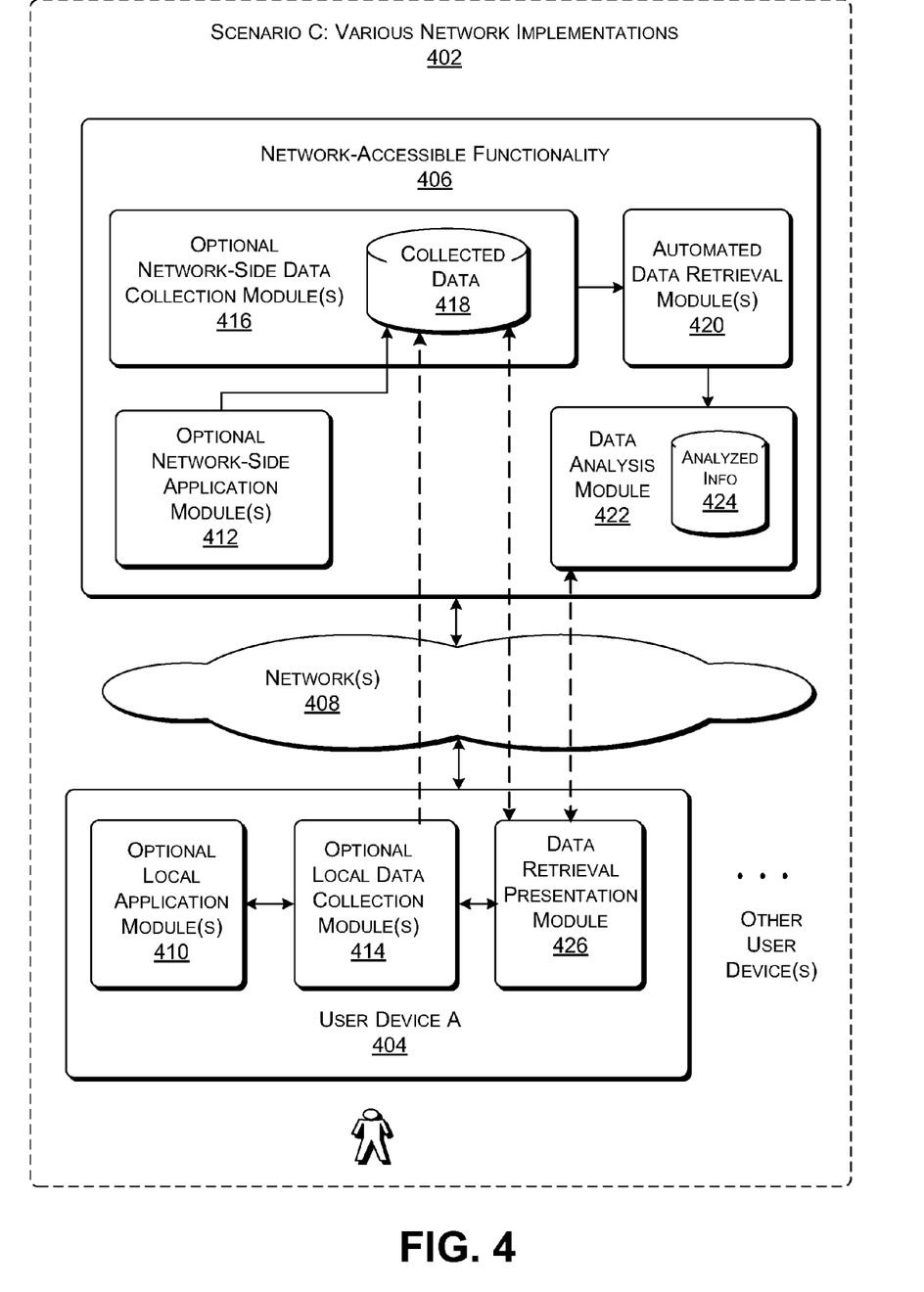
FIG. 4 shows a network implementation of the system of FIG. 1.

FIG. 1 shows a system 100 for processing action information. More specifically, the system 100 includes a collection of modules for first collecting action information and then utilizing the action information. The explanation of FIG. 1 emphasizes the functional role of the modules illustrated therein. FIGS. 2-4 show specific illustrative implementations of the system 100 of FIG. 1.

Taking a generally top-down approach to describing the figure, the system 100 shows a collection of application modules (102, 104, . . . 106) for performing any type of respective tasks. For example, an application module may correspond to an application program implemented on any type of computer device or a remote server device. Particular types of application modules include word processing programs, image editing programs, Email communication programs, Instant Messaging (IM) programs, and so forth.

The application modules (102, 104, . . . 106) include respective collection interfaces (108, 110, . . . 112) for providing action information, e.g., by exposing the action information so that it can be collected by another module in the system 100. As noted above, action information describes an action that takes place on an item or that is otherwise associated with an item. And an item is broadly defined as anything that can be acted upon, such as a file. In one case, an application module can be specifically written to incorporate a collection interface. In another case, a collection interface can be implemented as an "add-on" program which works in combination with a respective application module. In another case (not shown), a collection interface can be implemented as a program which exposes action information from multiple different application modules.

In one case, a collection interface can be "hardwired" in the sense that it exposes a predefined set of action information from an application module, e.g., corresponding to a predetermined set of actions that are pertinent to a task that the application module performs. For example, a collection interface for an Email program can expose a set of action information appropriate to common actions that are performed on Email messages, while an image editing application module can expose another set of action information appropriate to common actions that performed on images.

In another case, a collection interface can include set-up functionality that allows a user to choose from a predetermined set of actions that may be exposed. For instance, a collection interface can include a list of actions that can be monitored, allowing a user to enable or disable each action (e.g., by checking a box or radio button, and so on). In another case, a collection interface can include set-up functionality that allows a user to more freely define a type of action that will be monitored by the collection interface. For example, assume that a spreadsheet program includes a large library of actions that can be invoked. A control interface for this application module can be configured to allow a user to define the invocation of any one of these functions on a document as a reportable action.

In one illustrative case, a collection interface can create action information having a uniform format. FIG. 1 shows that the collection interface 112 for application module 106 produces action information 114. The action information 114 includes a plurality of action information records, such as representative action information record 116. Each action information record, in turn, can describe an action that took place on an item, or an action that is otherwise associated with the item. An action information record can include plural elements. A first element ("item type") describes a type of item that has been acted upon. For example, a particular digital photograph is an instance of an image file type. A second element ("item ID") provides any information which identifies the item that has been acted upon. A third element ("action") describes the type of operation that has been performed on the item. A fourth element ("time") identifies when the action on the item occurred, or more specifically, when it commenced. A fifth element ("time span") describes the interval over which the action took place. This list of five elements is merely representative; other implementations can include fewer than five elements or more than five elements. Other implementations can omit one or more of the above-enumerated elements and/or add new elements.

A collection module 118 performs the role of receiving action information from one or more application modules (102, 104, . . . 106). Later figures expand on the manner in which the collection module 118 can be implemented. Suffice it to say here that the collection module 118 can be implementing in different ways, e.g., as an operating system module, as part of one or more of the application modules, as a network-accessible service, and so on.

The collection module 118 includes an application interface 120 for receiving the action information from the application modules (102, 104, . . . 106) and for storing the action information in one or more stores 122 (referred to as a singular store for ease of reference below). To facilitate locating information within the store 122, any type of indexing module 124 can examine the action information and produce an index 126 of this information. The collection module 118 includes one or more retrieval interfaces 128 that allow other entities in the system 100 to access the action information stored in the store 122, as indexed by the indexing module 124.

On such entity that may access the action information is an automated data retrieval module 130. The automated data retrieval module 130 can correspond to an automated program that mines the store 122 for relevant information. For example, the automated data retrieval module 130 can periodically search the store 122 for action information that satisfies prescribed filtering criteria. Although FIG. 1 shows only one automated data retrieval module 130, the system 100 can include many such modules. Different entities can apply different respective data retrieval modules to perform different data mining activities, depending on the respective objectives of these entities.

One such entity that makes use of the retrieved data is a data analysis module 132. The data analysis module 132 can perform any processing on the action information extracted from the collection module 118. The data analysis module 132 can store the processed action information in a store 134 (or stores). The action information that is processed in this manner is referred to herein as analyzed information. To cite merely one example, the data analysis module 132 can identify groups of users who perform similar actions on particular types of items. For example, the data analysis module 132 can identify users who frequently use a particular type of commercially available tool to process images. As another example, the data analysis module 132 can identify users who use a high percentage of special-purpose functions provided by an application (which suggests that these users are performing a similar task). As will be described more fully below, this type of grouping can be leveraged for use in various social networking services.

An end user can operate a user data retrieval module 136 to interact with the system 100. In one case, the user data retrieval module 136 can correspond to search functionality that allows a user to enter a query. The search functionality returns a response to the user's query. The response is based at least in part on action information that is culled by the collection module 118.

More specifically, FIG. 1 shows that the user data retrieval module 136 can interact with the collection module 118 and/or the data analysis module 132. For instance, the user data retrieval module 136 may direct a query to the collection module 118. The user data retrieval module 136 may ask the collection module 118 to return action information that meets a prescribed criterion or plural criteria. More specifically, the user can select criteria that pertain to any feature(s) of the action information, including item type, item ID, action type, time, time span, and so on.

Consider one such query: the user may ask the collection module 118 to show all documents that the user opened in the last year. Here the search terms may identify the time span involved (the last year), the type of action involved ("opening a document"), and the type of item involved (which may be any type of file or a particular type of file). The user can further narrow the search by adding yet additional actions. For example, the user can further specify that she wants to see only those documents opened in the last year in which she also clicked on a link within the document. This might be useful in those cases in which the user has a good recollection that she clicked on a link in a document, but she cannot seem to recall the characteristics of the linked resource. Hence, this mode of retrieval allows a user to retrace her steps by attempting to remember "what was I doing then," rather than "what did this document say." In some circumstances, the express actions taken by the user may be more memorable than information that the user may have simply reviewed in a relatively passive manner.

The action-based search mode described above can be combined with traditional modes of query. For example, in additional to action-based filtering criteria, the user can also specify one or more conventional key word search terms or other characteristics of the items being sought. In this case, the search operations attempts to find items on which the user performed prescribed actions and which also include prescribed content.

As noted above, the user can also direct a query to the analyzed information maintained in store 134 of the data analysis module 132. The analyzed information is information that has been pre-processed with some objective in mind. For example, the user may enter a query to the data analysis module 132, asking this module to identify accountants who prepare tax documents by using a particular function of a commercially available tax program. In one case, the data analysis module 132 sanitizes the data that it provides so that it does not reveal the identities of particular users. For example, the results provided by the data analysis module 132 can provide general statistics regarding the use of a particular function. In another case, users who operate certain applications can authorize the release of personal data. In this case, in response to a query by a particular user, the data analysis module 132 can provide contact information associated with other users who behave in the same way as the querying user. Such contact information can include any type of network address information, physical address information, telephone information, and so on.

In another case, a user can enter a query which is directed to both the collection module 118 and the data analysis module 132. For example, the user can ask the system 100 to identify instances of a certain type of action that the user has taken over the last month. The collection module 118 can be called on to provide these results. In addition, the data analysis module 132 can be called on to supplement the results by also revealing other users who have a pattern of conduct that is similar to the querying user.

The system 100 includes a presentation module 138. The role of the presentation module 138 is to format the results obtained from the collection module 118 and/or the data analysis module 132 in an appropriate way. In one case, the presentation module 138 can present the results as a list. In another case, the presentation module 138 can provide the results in the form of a timeline presentation. Later figures describe different ways that the presentation module 138 can present results to a user.

Information extracted from the collection module 118 and/or the data analysis module 132 can be leveraged for other uses (e.g., besides search-related uses or in addition to search-related uses). In one case, the stored action information maintained in the collection module 118 can enable a user (or other entity) to duplicate the effects of changes that have been made on an item, assuming that the user still has a copy of the item in a prior state. This may be useful in reproducing an item that has been lost after various actions were performed on the item.

In another case, the stored action information can enable a user to reverse the effects of one or more actions that have been taken on an item. Namely, the action information may reveal that an item has undergone five successive changes in the last month. In some cases, the user can transform the current state of the item to a prior state of the item by reversing one or more operations. It will be appreciated that some operations are not reversible. For example, an operation which rotates an image is generally reversible. An operation which performs lossy compression on the image may not be fully reversible because some information has been lost.

The user can perform the above-described transformations using various user interfaces. In one case, the user can successively advance through successive versions of the item, e.g., either going forward in time from a prior version or going backward in time from a current version. In another case, the user can select a final state of the item and one or more transformations can be performed to produce that state.

In another example, a provider of a product can use the data obtained from the collection module 118 and/or the data analysis module 132 to improve its product. For example, assume that the provider determines that users typically engage in certain activities using its product (but perhaps not other activities). Based on this insight, it can redesign its product to make the popular functions more accessible, and so on. The product may correspond to a software product, a network-accessible service, an electronic device, and so on.

In another example, an advertiser can use the data obtained from the collection module 118 and/or the data analysis module 132 to improve its targeting of advertisements to users.

Still other applications are possible.

A.2. Illustrative Implementations

FIGS. 2-4 show three different ways to implement the system 100 of FIG. 1. These implementations are representative, meaning that they do not exhaust the myriad of ways in which the principles described herein can be implemented.

FIG. 2 shows a first scenario 202 in which both the data collection and retrieval aspects of the system 100 are performed by a single data processing device or by a cooperative collection of local data processing devices. A data processing device can correspond to any kind of electronic processing device, such as a personal computer, a laptop computer, a personal digital assistant (PDA), a game console device, a set-top box associated with a television unit, and so forth.

In this implementation, the data processing device includes one or more application modules 204 for providing the action information, a data collection module 206 for collecting the action information, and a data retrieval and presentation module 208 for retrieving and presenting the action information. The data retrieval and presentation module 208 combines the functions of the data retrieval module 136 and the presentation module 138 of FIG. 1.

In FIG. 2, the application modules 204 correspond to application-layer programs for performing prescribed tasks. The data collection module 206 corresponds to an operating system (OS)-level module for collecting the action information. The data retrieval and presentation module 208 can correspond to either an application-level program and/or an OS-level program.

The three modules (204, 206, 208) work in cooperation with each other but may otherwise be produced in an independent manner. For example, the data collection module 206 can collect action information from multiple different application modules 204 without being commercially affiliated with any of these application modules. The data retrieval and presentation module 208 can leverage this independence to produce results that combine action information extracted from different application modules. Moreover, the different application modules can vary widely and may even be incompatible. For example, the data retrieval and presentation module 208 can generate an output result based on actions performed by two word processing programs produced by two different commercial software providers.

FIG. 3 shows another local implementation 302 of the system 100 of FIG. 1. This implementation 302 also includes one or more application modules 304, a data collection module 306, and a data retrieval and presentation module 308. In this case, however, the data collection module 306 is integrated with at least one of the application modules 304. In one case, an application module can be produced to include the data collection module 306 as one of its core functions. In another case, an application module can be later integrated with another application-level program that implements the data collection module 306. In the latter case, the application module incorporates the data collection module 306 as an "add-on" type of program.

FIG. 4 shows a third implementation 402 that relies on a network. Namely, the implementation 402 includes at least one user device 404 that is communicatively coupled to network-accessible functionality 406 via one or more networks 408. The user device 404 can correspond to any type of data processing device mentioned above. The network-accessible functionality 406 can correspond to any type and/or combination of network-accessible services, such as one or more server-type computers, data stores, routers, and so on, implemented at a single site or distributed over plural sites. As an alternative to the use of the network-accessible functionality 406, or in addition to this functionality 406, user devices can interact with each other using peer-to-peer (P2P) communication. The networks 408 can represent a local area network (LAN), a wide area network (WAN) (e.g., the Internet), or some combination of LAN(s) and WAN(s). The networks 408 can be implemented by any combination of wireless links, hardwired links, routers, gateways, name servers, and so forth, and can be governed by any protocol or combination of protocols.

The functions identified in FIG. 1 can be spread over the implementation 402 shown in FIG. 4 in various ways. FIG. 4 shows that the user device 404 includes local application modules 410 and the network-accessible functionality 406 includes network application modules 412 (e.g., such as Terminal Services applications). The local application modules 410 and/or the network-accessible application modules 412 can be used to provide (e.g., expose) action information.

FIG. 4 shows that the user device 404 includes a local data collection module 414 and the network-accessible functionality 406 includes a network-accessible collection module 416. The local data collection module 414 and/or the network-accessible data collection application module 416 can be used to collect action information. In the network-accessible implementation, the collection module 416 can potentially collect action information from plural different user devices (not shown) and store the action information in one or more stores 418. The network-accessible data collection module 416 can store identifying information which identifies the user devices from which the action information originated.

FIG. 4 shows that network-accessible functionality 406 includes an automated data retrieval module 420, a data analysis module 422, and a store 424 for storing analyzed information. These modules complement the same-labeled modules of FIG. 1 (i.e., modules 130, 132, and 134, respectively). Namely, the automated data retrieval module 420 retrieves action information from the network-accessible data collection module 416 and supplies the information to the data analysis module 422. The data analysis module 422 performs prescribed operations on the action information in accordance with any kind of pre-programmed objective. The data analysis module 422 stores its results (the analyzed information) in the store 424. Although not illustrated in FIG. 4, the user device 404 can alternatively implement an automated data retrieval and analyzing function (instead of the network-side functionality). Or device-side retrieval and analyzing functionality can work in cooperation with complementary network-side functionality.

A device-side data retrieval and presentation module 426 can extract information from the local data collection module 414 and/or the network-accessible data collection module 416 and/or the network-accessible data analysis module 422 (and/or, although not shown, a local data analysis module 422). Further, although not shown, aspects (and perhaps all) of the data retrieval and presentation module 426 itself can be implemented by the network-accessible functionality 406.

Figure 5:
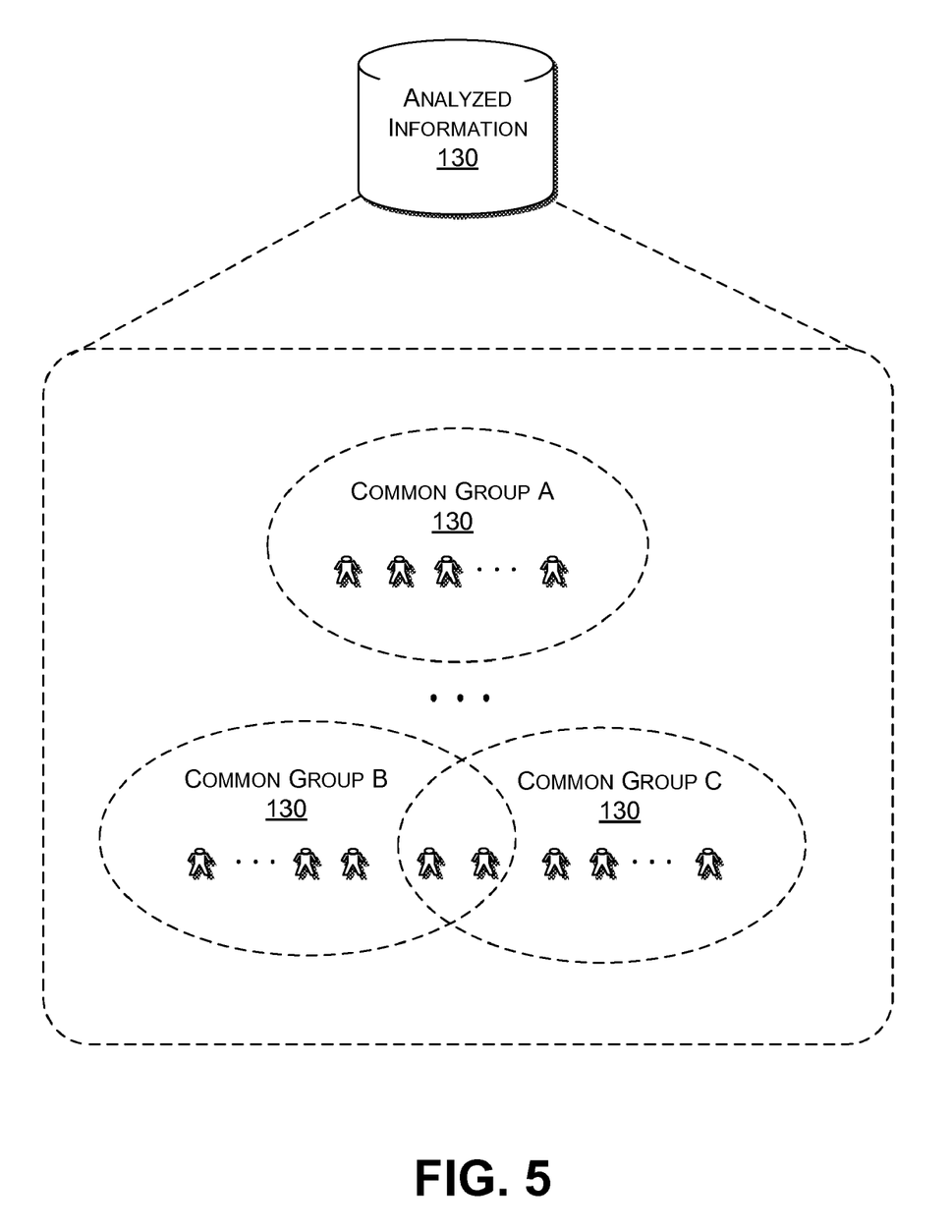
FIG. 5 shows the use of the network implementation (of FIG. 4) to identify groups of users who engage in similar behavior.

The network implementation 402 is particularly well suited for identifying the behavior of groups of users. For example, the data analysis module 422 can periodically mine the collected action information to identify users who appear to be performing the same kinds of actions on the same types of items. Members of a group of similar-behaving users likely have common interests. FIG. 5 graphically illustrates three groups of users identified by the data analysis module 422, as expressed by analyzed information maintained in store 424.

There are different ways to utilize the analyzed information illustrated in FIG. 5. In one case, as described above, the user can perform searches within the analyzed information. Through this search operation, the user can discover other users who behave in a similar manner to the user. The user can engage these users in any way, such as by asking the advice of these users, buying and/or selling items from these users, and so on.

In another case, one or more components in a data processing environment can automatically forward diagnostic data to an appropriate group of experts, as assessed by the data analysis module 422. The diagnostic data may include raw information associated with the failure or abnormal performance of a system component. The group of experts can provide advice to a person or organization affected by the failure. The group of experts can also forward their analysis to the provider of a faulty product, and so on.

A.3. Illustrative User Interface Presentations

The next series of figures shows various ways that the system 100 of FIG. 1 can interact with a user. Starting with FIG. 6, the presentation module 138 can output the results of a search as a timeline presentation 602. That is, the presentation module 138 can display the timeline presentation 602 on an electronic display device (e.g., a computer monitor, etc.), and/or can print the timeline presentation 602 using a printer device, and so on.

Figure 6:
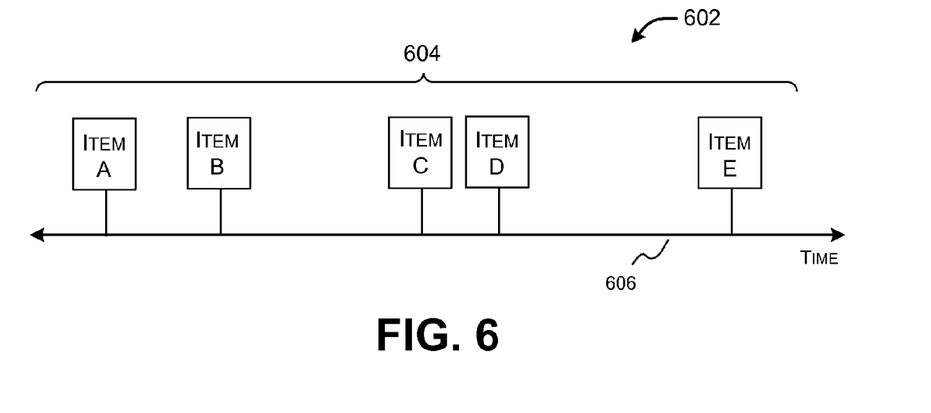
FIG. 6 shows a timeline presentation that is used to convey action information.

The timeline presentation 702 includes a series of item identifiers 604 arranged on a timeline 606. More specifically, the item identifiers 604 include any information that represents associated items, such as any combination of textual information, symbolic information, pictorial information, audio information, etc. For example, consider the scenario in which the items correspond to files. In this case, item identifiers 604 can list the names of the files or abbreviated versions of the names. FIG. 6 shows that a scenario in which the item identifiers 604 generically represent the items by letters.

The item identifiers 604 (which are associated with respective items) are arranged on the timeline 606 at locations which correspond to the temporal occurrence of actions performed on the respective items. In other words, the spacing between identifiers is proportional to the interval of time that separates the actions performed on the corresponding items.

The timeline presentation 602 can be produced by specifying any filtering criterion or plural filtering criteria. As stated above, any of the elements of the action information can be used to specify filtering criteria. Filtering can be performed for different types of items, different types of actions, different time spans, and so on. Further, the filtering can combine filtering constraints in various ways. For example, a first search can ask the system 100 to show events corresponding to both actions X and Y on either item types A or B. A second search can ask the system 100 to show events corresponding to actions L, M, or N on any item type.

In any case, the timeline presentation 602 may serve as a useful visual device to help jog the user's memory, allowing the user to retrieve one or more desired items that she is searching for. For example, the user may have a vague recollection that she stored a particular word processing document at a time when she was particular busy. She remembers that time as being about nine months ago. She also remembers that she was in the habit of compressing her documents at that time. Based on this partial recollection of prior behavior, the user may enter filtering terms that ask the system 100 to retrieve documents that were compressed and stored over the last twelve months. When the results are presented to the user, the user may notice that a group of item identifiers are clustered together along the timeline 606, suggesting that the user was particularly busy at that point in time in compressing and storing documents. Based on this hint, the user can first investigate documents in that cluster. Namely, the user can mouse over an item identifier to receive metadata associated with the item and/or a thumbnail version of the item. The user can click on an item identifier to retrieve and examine the corresponding item itself.

Figure 7:
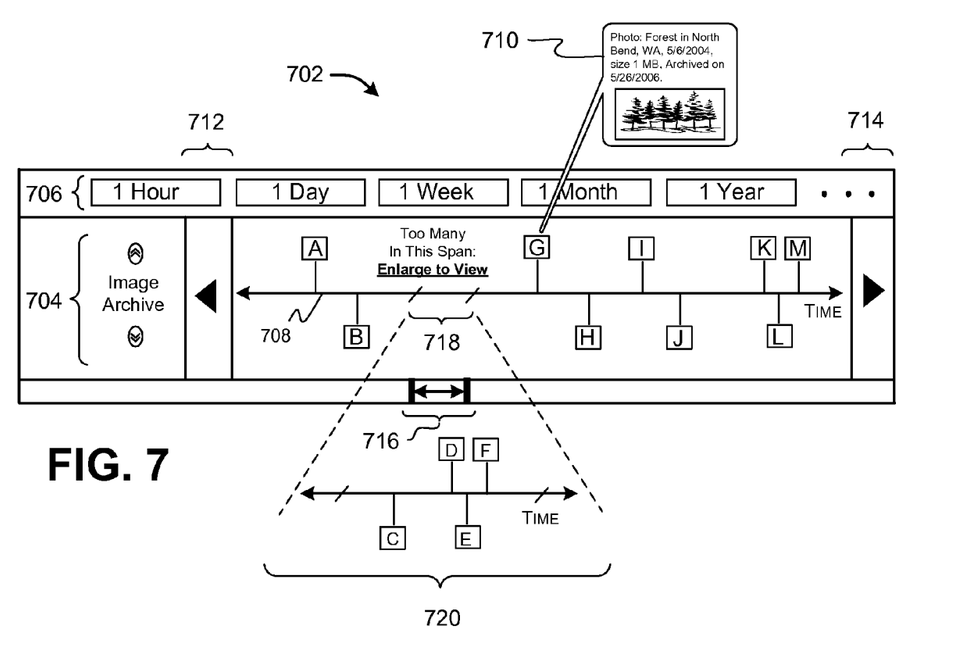
FIG. 7 shows a more detailed version of the timeline presentation of FIG. 6.

FIG. 7 illustrates a more detailed version of a timeline presentation 702. This timeline presentation 702 includes additional functionality compared to the timeline presentation of FIG. 6. To provide a concrete example, FIG. 7 shows the timeline presentation 702 applied to various actions performed on image file data types. These actions may correspond to operations taken to transform the image files. These actions affect the actual content of the image files. Or the actions may correspond to operations taken to manage the image files, and so on.

The timeline presentation 702 includes an action input field 704 for specifying the type of action that the user is interested in investigating. In this case, the user is interested in investigating images that have been archived over a prescribed period of time, e.g., by storing these documents in a long-term storage location. In this case, the action corresponds to "Image Archive."

Figure 8:
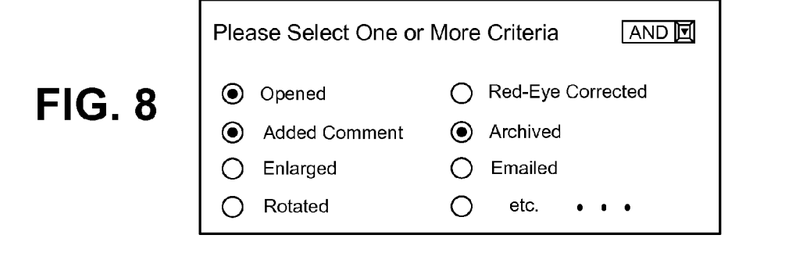
FIG. 8 shows an interface for specifying actions; one use of such an interface is to govern the type the action information that is shown in the timeline presentation of FIG. 7.

Although not shown in FIG. 7, the user can select multiple actions. For example, FIG. 8 shows an interface that allows a user to input multiple actions. In a conjunctive ("AND") mode of operation, the system 100 of FIG. 1 can respond to multiple selections by presenting only those items that have been processed by all of the selected actions. In an alternative ("OR") mode of operation, the system 100 can present items that have been processed by any of the actions that have been selected. Incidentally, a collection interface of an application module (such as collection interface 108 of application module 102) may include a similar type of interface for use in allowing a user to select the type of actions that are monitored by the application module itself.

Returning to FIG. 7, the timeline presentation 702 also includes a scope input field 706 for selecting the scale of a timeline 708 produced by the timeline presentation 702. In one merely illustrative example, the user can select the scale as one hour, one day, one week, and so on.

As shown, the action and scope selections prompt the item presentation module 702 to display a list of item identifiers along a timeline 708. The item identifiers correspond to items (e.g., digital photographs) that match the filtering criteria. That is, these image files were archived within a selected span of time. As stated above in the context of FIG. 6, the positions of item identifiers along the timeline 708 mirror the timing at which the actions took place. The item identifiers can represent the associated items in any manner, e.g., using any combination of textual information, symbolic information, pictorial information, audio information, and so on. FIG. 7 shows a scenario in which a user has moused over one of the item identifiers to produce a pop-up bubble 710. This bubble 710 conveys both textual metadata associated with the item and a thumbnail version of the item. The user can retrieve the actual item by clicking on the item identifier or performing some other retrieval operation.

The user can advance to different parts of the timeline 708 using different instructions. For instance, the user can activate a back control 712 to move the timeline 708 back in time. The user can activate a forward control 714 to move the timeline 708 ahead in time. The user can activate the scope controls 706 (described above) to change the overall scale of the timeline 708. The user can also activate a zoom control 716 to expand a portion of the timeline 708. The user may opt to perform this action because there is too much action detail clustered together in one part of the timeline 708. For example, a portion 718 of the timeline 708 omits item identifiers because these identifiers would be too bunched together to convey meaningful information to the user. The user can temporally expand this compressed portion 718 to produce an expanded portion 720. The expanded portion 720 shows the item identifiers that were omitted in the main timeline 708.

As a final note, the timeline presentation 702 corresponds to a particular item type, namely image files. Although not shown, the timeline presentation can include a similar field to the action field 704 for allowing the user to select a different item type and/or to select plural item types (e.g., item type A or B as a filtering term, or item type L and M as a filtering term, etc.).

Figure 9:
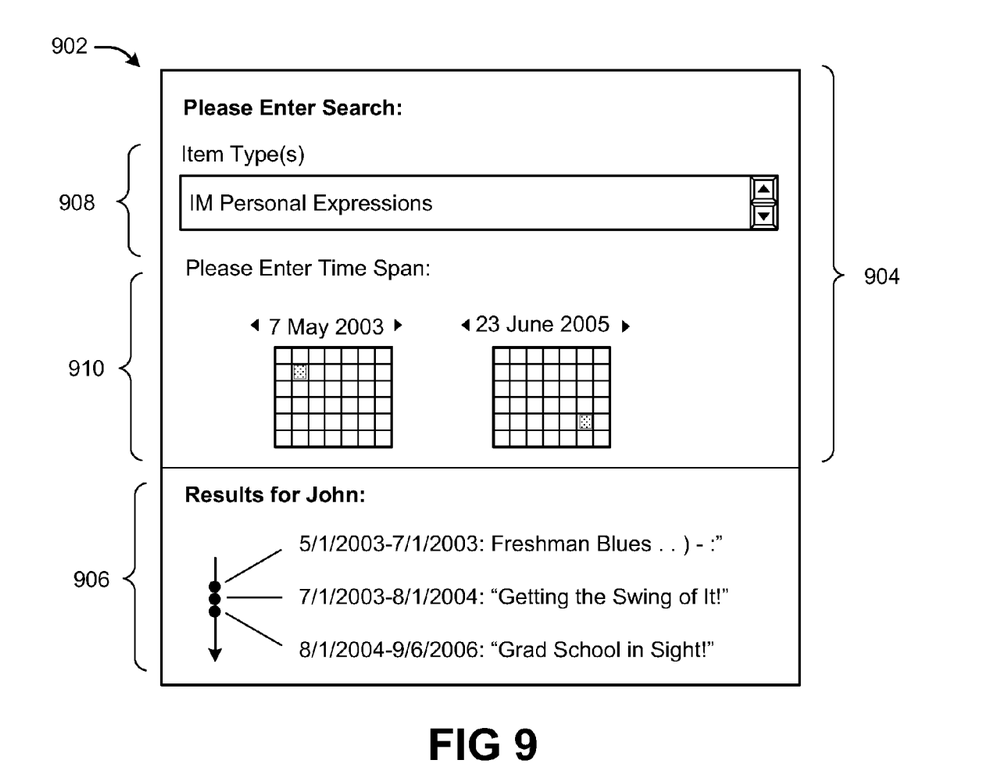
FIG. 9 shows a search interface for inputting a search query and receiving a result. The result is formed based on action information collected via the system of FIG. 1.

FIG. 9 shows another example of how a user ("John") can extract action information from the system 100 to meet specific needs. In this search presentation 902, a first part 904 allows John to specify search terms. A second part 904 shows the results of a search based on the search terms. Namely, the second part 904 presents action information (received from the data collection module 118) which matches John's search terms.

In this case, in the first part 904, John has identified that he is interested in reviewing personal messages that John has selected to represent himself in an Instant Messenger (IM) system over a span of time. Namely, these personal messages are textual messages that appear in other individuals' IM display panels when these individuals are conversing with this particular person. A first field 908 allows John to select a desired item type, in this case corresponding to IM personal expressions. A second field 910 allows John select a span of time from which he wishes to extract action information. The action of interest in this case corresponds to the setting/changing of personal expression messages. The second part 906 displays the personal messages of John in a timeline-type presentation.

Figure 10:
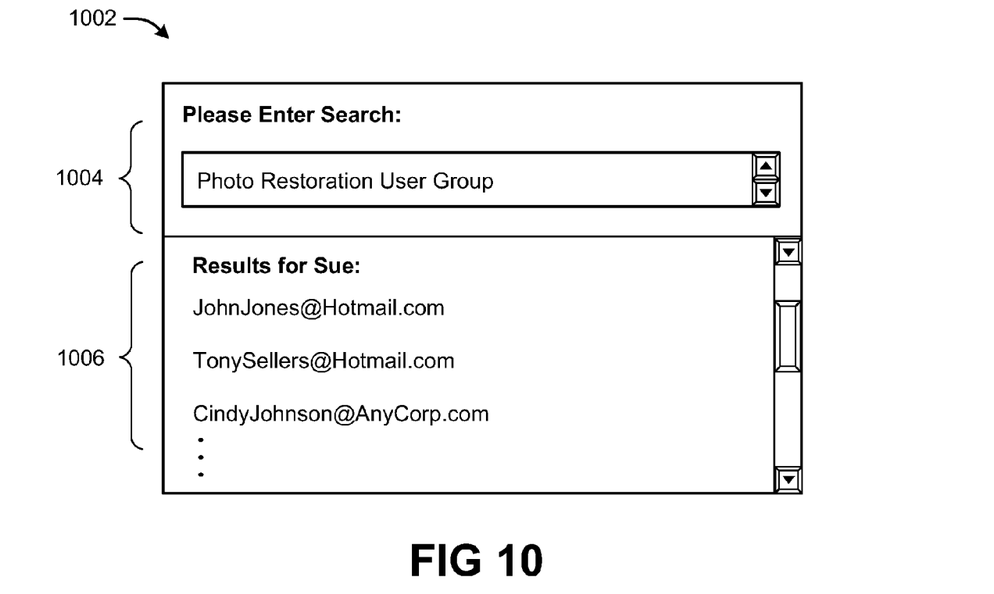
FIG. 10 shows another search interface for inputting a search query and receiving a result. The result in this case identifies users who engage in prescribed behavior.

FIG. 10 shows another example of how a user ("Sue") can extract action information from the system 100 to meet specific needs. In this search presentation 1002, a first part 1006 allows Sue to specify search terms. In this case, the first part 1004 allows Sue to specify that she is interested in exploring other individuals who use a certain software product in the same way that she does, e.g., perhaps invoking a certain function of the product to process files. A second part 1006 presents information extracted from the data analysis module 132 that identifies users who behave like Sue in regards to the identified activity. The second part 1006 particularly identifies the Email address of users in the common-interest group. Sue may wish to contact one or more of these users to solicit advice regarding the use of the software product, to form friendships, and so on. It will be understood that the system 100 can be configured to protect privacy through various mechanisms, such as by only displaying contact information for those users who want to participant in this community-related service. Further, it will be understood that the second part 1006 can identify users in many different ways or combination of ways (besides, or in addition to, Email addresses).

A.3. Illustrative Processing Functionality

Figure 11:
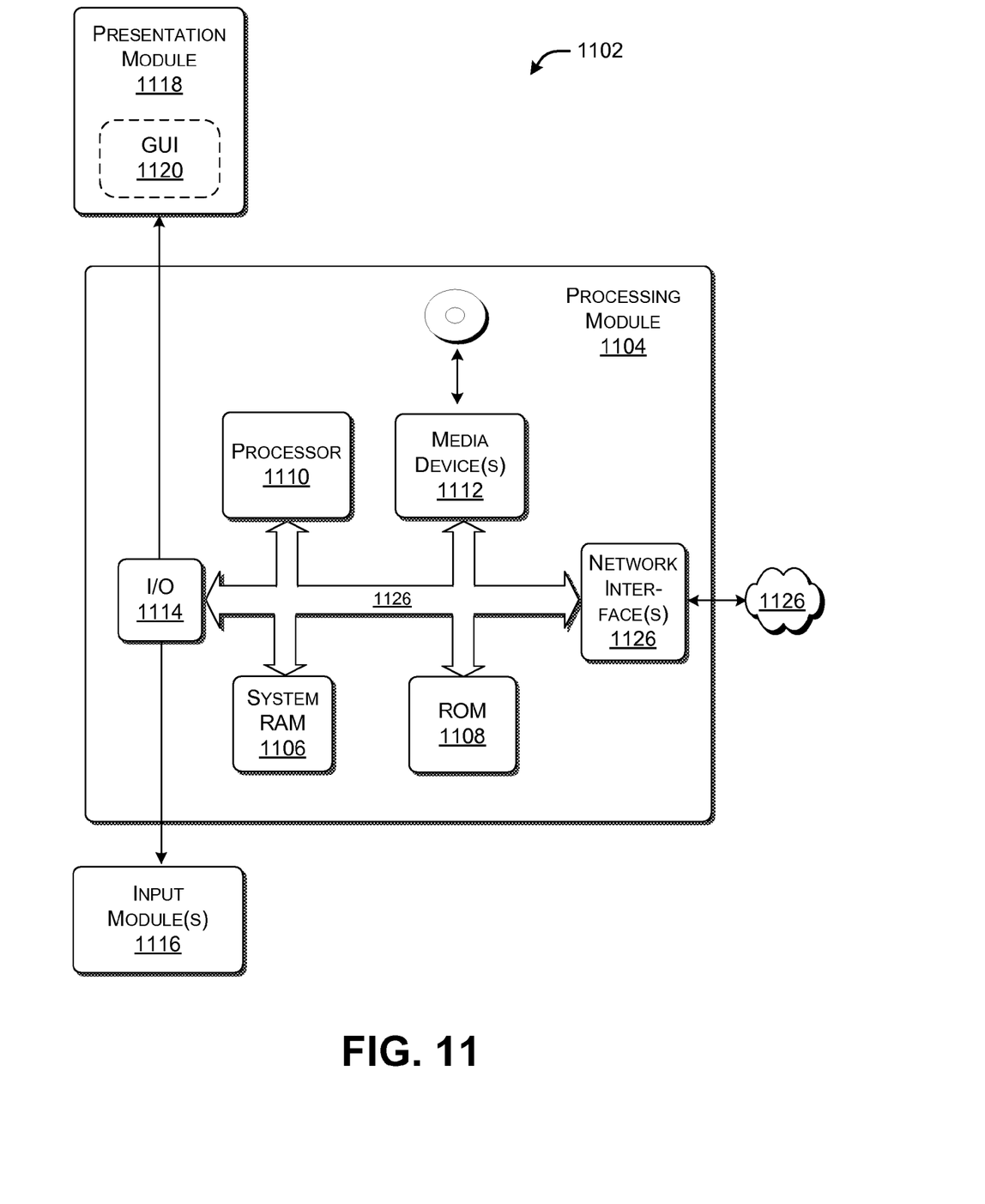
FIG. 11 is data processing functionality for implementing any aspect of the systems of FIGS. 1-4.

Advancing to FIG. 11, this figure sets forth illustrative processing functionality 1102 that can be used to implement any aspect of system 100 shown in FIGS. 1-4. In one non-limiting case, for instance, the processing functionality 1102 may represent any computer machine used by the system 100, e.g., to implement any aspect of any user devices of FIGS. 2-4, and/or any aspect of the network-accessible functionality 406 (of FIG. 4), and so forth.

The processing functionality 1102 can include a processing module 1104 for implementing various processing functions. The processing module 1104 can include volatile and non-volatile memory, such as RAM 1106 and ROM 1108, as well as one or more processors 1110. The processing functionality 1102 can perform various operations identified above when the processor(s) 1110 executes instructions that are maintained by memory (e.g., 1106, 1108, or elsewhere). The processing functionality 1102 also optionally includes various media devices 1112, such as a hard disk module, an optical disk module, and so forth.

The processing functionality 1102 also includes an input/output module 1114 for receiving various inputs from the user (via input module 1116), and for providing various outputs to the user (via presentation module 1118). The presentation module 1118 can provide a graphical user interface (GUI) 1120. The processing functionality 1102 can also include one or more network interfaces 1122 for exchanging data with other devices and systems via one or more communication conduits 1124. One or more communication buses 1126 communicatively couple the above-described components together.

B. Illustrative Procedures

Figures 12, 13:
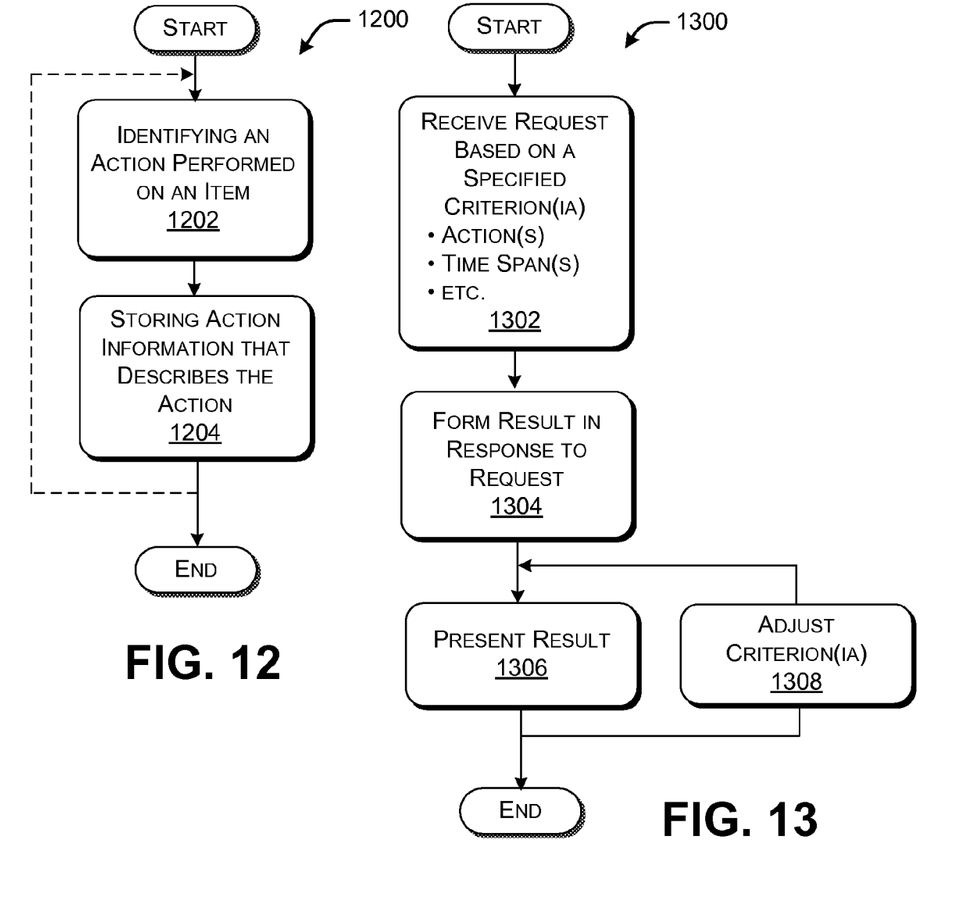
FIG. 12 is a flowchart that shows an illustrative procedure for identifying and storing action information.
FIG. 13 is a flowchart that shows an illustrative procedure for presenting a result based on the action information collected via the procedure of FIG. 12.
Figure 14:
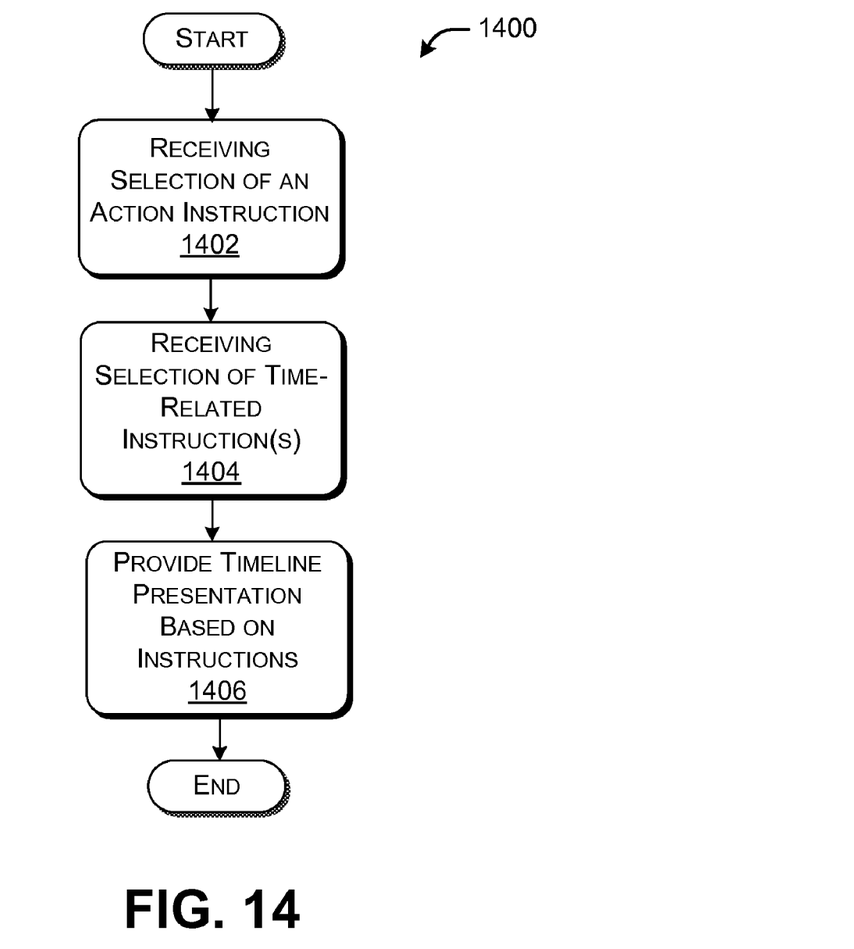
FIG. 14 is a flowchart that shows an illustrative procedure for displaying action information in a timeline presentation.

FIGS. 12-14 show procedures which explain the operation of the system 100 in flow chart form. As the functions described in the flowcharts have already been set forth in Section A, Section B serves principally as a review of those functions.

FIG. 12 shows a procedure 1200 for storing action information. In block 1202, the application modules (102, 104, ... 106) can identify actions that are performed on items. The application modules (102, 104, ... 106) can be configured to look for specific actions performed on specific items in the manner described above. In block 1204, the data collection module 118 stores the action information provided by the application modules (102, 104, ... 106).

FIG. 13 shows a procedure 1300 for retrieving action information and presenting it to a user. In block 1302, the system 100 receives a request to retrieve action information that matches a search criterion or plural search criteria. The user may direct his or her search to the data collection module 118 and/or the data analysis module 132. In block 1304, the system 100 forms a result based on the user's query. This may constitute culling action information from the store 122 of data collection module 118, and/or extracting already pre-processed (analyzed) information from the store 134 of the data analysis module 132. In block 1306, the presentation module 138 outputs the results to the user in a desired format, such as a list format, a timeline presentation, and so on. In block 1308, the user may change one or more search parameters, resulting in the re-presentation of the result information in block 1306. For example, the user can change the scope of the timeline presentation, causing the timeline presentation to be re-displayed in the new temporal scope.

FIG. 14 shows a procedure 1400 for specifically formulating results in a timeline presentation. In block 1402, the presentation module 138 accepts the user's selection of one or more actions. In block 1404, the presentation module 138 accepts the user's selection of one or more time-related constraints, such as a time scope constraint, and so on. In block 1406, the presentation module 138 provides a timeline presentation that matches the above-described filtering criteria.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A system of one or more computing devices, comprising:
one or more processors; and
memory to store computer-executable instructions that, when executed by the one or more processors, perform operations for collecting and presenting temporal-based action information, comprising:
  identifying at least one action that pertains to at least one item;
  storing action information associated with the at least one action that pertains to the at least one item, wherein the action information being stored comprises:
    a type of action corresponding to the at least one action that pertains to the at least one item;
    a time of occurrence of the at least one action including a start time of performance of the at least one action on the at least one item;
    a span of time lasting from the start time until completion of the performance of the at least one action on the at least one item; and
    an identifier for a user performing the action on the at least one item;
  storing item information associated with the at least one item to which the at least one action pertains, wherein the item information being stored comprises:
    an item type associated with the at least one item;
    identification information associated with the at least one item including an item identifier (ID);
  receiving a query posed by the user via a user data retrieval module, the query comprising one or more search criteria comprising a selected item feature and at least one feature of the action information, the selected item feature including at least one of:
    item type; or
    item ID; and
  the at least one feature of the action information selected from a group comprising:
    action type;
    time of action occurrence; and
    time span of action; and
  determining by a collection module at least one action taken by the user corresponding to the query posed by the user;
  determining by a data analysis module at least one group of users who have engaged in activity corresponding to the query posed by the user, the at least one group of users including the user, the determining being based at least on:
    the one or more search criteria including the selected item feature and the at least one feature of the action information; and
    users being identified who have performed actions of the at least one feature of the action information and the actions being performed on items of the selected item feature; and
  forming a result in response to the query posed by the user, the result comprising:
    the at least one group of users; and
    contact information for at least one user in the at least one group of users, the respective user having authorized the contact information for distribution.

2. The system of claim 1, wherein the operations further comprise collecting the action information,
  wherein the identifying is performed by one or more application modules,
  the collecting is performed by the collection module, and
  the storing is performed on an operating system level module.

3. The system of claim 1, wherein the operations further include collecting the action information, and
  wherein the identifying, the collecting and the storing are all performed by an application module.

4. The system of claim 2, wherein the identifying, the collecting and the storing are all performed for actions identified by the one or more application modules, and wherein a result that is formed is based on action information collected from the one or more application modules.

5. The system of claim 1, wherein the operations further include:
  automatically extracting action information that has been stored, and
  processing the extracted action information to produce analyzed information,
  wherein the forming the result is based at least in part on the analyzed information.

6. The system of claim 1, wherein the forming the result is based on search criteria to identify actions taken on items that have occurred within a specified time span.

7. The system of claim 1, wherein the operations further comprises presenting the result of the at least one action taken by the user corresponding to the query posed by the user;
  wherein the presenting comprises displaying the result in the form of a timeline presentation;
  wherein one or more item identifiers are placed at appropriate locations on the timeline presentation; and
  wherein the one or more item identifiers represent one or more respective actions on items.

8. The system of claim 7, wherein the operations further comprises receiving a selection of an action instruction, and wherein the action instruction specifies the one or more respective actions on the items.

9. The system of claim 7, wherein the operations further comprises receiving a user's selection of a scope instruction, and wherein the timeline presentation has a temporal scope that is based on the scope instruction.

10. The system of claim 1, wherein the at least one item is a file, and wherein said at least one action is an action that is taken on the file.

11. The system of claim 1, wherein the at least one item is a message, and wherein the at least one action is an action that is taken on the message.

12. The system of claim 1, wherein the at least one item is a feature of presence information in an Instant Messaging system, and wherein the at least one action is an action that is taken on the feature.

13. A system of one or more computing devices, comprising:
   one or more processors; and
   memory to store computer-executable instructions that, when executed by the one or more processors, perform operations presenting temporal-based action information, comprising:
      displaying an action input field storing one or more selectable action types;
      displaying a Boolean mode of operation input field storing one or more selectable Boolean modes of operation;
      receiving a selection of an action instruction, wherein the action instruction specifies one or more types of actions;
      receiving a selection of a Boolean mode of operation instruction, wherein the Boolean mode of operation specifies at least one Boolean mode of operation;
      receiving a selection of a scope instruction, wherein the scope instruction specifies a temporal scope of presentation including a time of occurrence of at least one action beginning being enacted on at least one item;
      displaying a timeline presentation, the timeline presentation displaying item identifiers corresponding to the at least one action taken on the at least one item in the context of at least one application satisfying the received action instruction including a span of time during which the at least one action is being enacted on the at least one item, the span of time commencing with the time of occurrence beginning and extending until the action is being ended for the time of occurrence, the received Boolean mode of operation and the received scope instruction, and wherein:
         the at least one item is associated with an item type;
         the timeline presentation comprises a zoom control;
         the at least one action conforms to the one or more types of actions selected by the action instruction that pertain to the at least one item; and
         the timeline presentation has a temporal scope that is based on the scope instruction;
      receiving user's activation of the zoom control; and
      displaying an expanded portion of the timeline presentation comprising at least one previously omitted item identifier in the timeline presentation responsive to the user's activation of the zoom control.

14. A computer apparatus for presenting temporal-based action information, comprising:
   memory storing logic executable by one or more processors, the memory comprising:
      logic configured to display an action input field storing one or more selectable action types;
      logic configured to display a Boolean mode of operation input field storing one or more selectable Boolean modes of operation;
      logic configured to receive a selection of an action instruction, wherein the action instruction specifies one or more types of actions;
      logic configured to receive a selection of a Boolean mode of operation instruction, wherein the Boolean mode of operation specifies at least one Boolean mode of operation;
      logic configured to receive a selection of a scope instruction, wherein the scope instruction specifies a temporal scope of presentation including a time of occurrence of at least one action beginning being enacted on at least one item;
      logic configured to display a timeline presentation, wherein the timeline presentation displays item identifiers corresponding to at least one action taken on at least one item in the context of at least one application satisfying the received action instruction including a span of time during which the at least one action is being enacted on the at least one item, the span of time commencing with the time of occurrence beginning and extending until the action is being ended for the time of occurrence, the received Boolean mode of operation and the received scope instruction, and wherein:
         the at least one item is associated with an item type;
         the timeline presentation comprising a zoom control;
         the at least one action conforms to the one or more types of actions selected by the action instruction that pertain to the at least one item; and
         the timeline presentation has a temporal scope that is based on the scope instruction;
      logic configured to receive user's activation of the zoom control; and
      logic configured to display an expanded portion of the timeline presentation comprising at least one previously omitted item identifier in the timeline presentation responsive to the user's activation of the zoom control.

15. The system of claim 1, wherein the authorized contact information is any one of network address information, physical address information, and telephone information.

16. The system of claim 1, wherein authorized contact information is determined to be authorized based at least on the respective user's affiliation with a common-interest group.

17. The system of claim 1, wherein the formed result is presented to a social network.

18. The system of claim 1, wherein forming the result in response to the query posed by the user comprises at least one of:
   enabling duplicating at least one action on the at least one item based on the action information; or
   enabling reversing at least one action on the at least one item based on the action information.

19. The system of claim 1, wherein types of action being stored comprise at least one of:
   creating the item;
   opening the item;
   modifying the item;
   deleting the item;
   following a link in the item;
   responding to the item;
   compressing the item; or
   using the item.

20. The system of claim 1, wherein types of items being stored comprise at least one of:
   a file;

an email;
a photo;
an instant message;
a document; or
a spreadsheet.

* * * * *